United States Patent
Takechi et al.

[11] Patent Number: 6,077,628
[45] Date of Patent: Jun. 20, 2000

[54] NONAQUEOUS ELECTROLYTIC SOLUTION FOR BATTERY AND NONAQUEOUS ELECTROLYTIC SOLUTION BATTERY

[75] Inventors: Kensuke Takechi; Akihiko Koiwai; Tohru Shiga, all of Aichi, Japan

[73] Assignee: Kabushiki Kaisha Toyota Chuo Kenkyusho, Aichi-gun, Japan

[21] Appl. No.: 09/062,651

[22] Filed: Apr. 20, 1998

[30] Foreign Application Priority Data

Apr. 21, 1997 [JP] Japan .................................. 9-102842

[51] Int. Cl.$^7$ ............................................. H01M 10/40

[52] U.S. Cl. ........................ 429/325; 429/200; 429/326

[58] Field of Search ....................... 429/200, 325, 429/326

[56] References Cited

U.S. PATENT DOCUMENTS

| 5,514,493 | 5/1996 | Waddell et al. | 429/200 X |
| 5,707,760 | 1/1998 | Stux et al. | 429/326 X |

FOREIGN PATENT DOCUMENTS

| 59-108276 | 6/1984 | Japan . |
| 59-151769 | 8/1984 | Japan . |
| 4-284372 | 10/1992 | Japan . |
| 7-122297 | 5/1995 | Japan . |

*Primary Examiner*—Stephen Kalafut
*Attorney, Agent, or Firm*—Oblon, Spivak, McClelland, Maier & Neustadt, P.C.

[57] ABSTRACT

A nonaqueous electrolytic solution for a battery, which contains a supporting electrolyte which reacts with water to produce an acid; and a complex-forming compound which forms an inert complex by reacting with water and a supporting electrolyte to prevent acid generation.

6 Claims, 2 Drawing Sheets

NONAQUEOUS ELECTROLYTIC SOLUTION FOR BATTERY AND NONAQUEOUS ELECTROLYTIC SOLUTION BATTERY

BACKGROUND OF THE INVENTION

1. Field of the Invention

The present invention relates to a nonaqueous electrolytic solution for a battery and a nonaqueous electrolytic solution battery. More particularly, the present invention relates to a secondary lithium battery comprising a nonaqueous electrolytic solution containing a predetermined halogen compound as a supporting electrolyte. Even more particularly, the present invention relates to a nonaqueous electrolytic solution for a battery which is arranged to prevent the production of hydrogen halide due to inevitable inclusion of a small amount of water content and a nonaqueous electrolytic solution battery comprising such a nonaqueous electrolytic solution.

2. Description of the Background

A nonaqueous electrolytic solution battery comprising lithium or a compound thereof as an active electrode material and therefore an organic solvent dissolving a supporting electrolyte therein as an electrolytic solution has been noted for its usefulness as a primary battery as a small-sized power supply for electronic parts or a secondary battery or lithium ion battery for electric automobiles.

Referring further to such a nonaqueous electrolytic solution battery, as the supporting electrolyte there is often used, e.g., halide such as $LiPF_6$. However, if the electrolytic solution, which is supposed to be nonaqueous, inevitably contains some water content or has adsorbed water from other battery materials, the following reaction takes place to produce a hydrogen halide such as hydrogen fluoride HF.

$$LiPF_6 + H_2O \rightarrow 2HF + LiF + POF_3 \quad (1)$$

Hydrogen fluoride deteriorates materials constituting the battery, causing further deterioration of battery properties. It is also known that the foregoing reaction (1) is accelerated at high temperatures. Therefore, these problems become remarkable when the nonaqueous electrolytic solution battery is used as a secondary battery for electric automobiles which must operate stably at a temperature of from –30° C. to 60° C. Thus, it is said that a nonaqueous electrolytic solution battery comprising $LiPF_6$ as a supporting electrolyte can hardly be applied to such a use.

In order to overcome these difficulties, some proposals have been made. For example, JP-A-4-284372 (The term "JP-A" as used herein means an "unexamined published Japanese patent application"), which concerns an improvement in a nonaqueous electrolytic solution secondary battery, proposes that an oxide selected from the group consisting of $Al_2O_3$, MgO and BaO, if incorporated in a nonaqueous electrolytic solution containing $LiPF_6$ as a supporting electrolyte, adsorbs hydrogen fluoride produced in the electrolytic solution so that hydrogen fluoride is removed from the reaction system.

JP-A-7-122297, which concerns an improvement in a nonaqueous electrolytic solution battery, proposes that an acid anhydride (e.g., acetic anhydride), if incorporated in a nonaqueous electrolytic solution containing $LiPF_6$ as a supporting electrolyte, previously catches water in the electrolytic solution to inhibit the foregoing reaction (1).

However, the above cited JP-A-4-284372 has some disadvantages. In accordance with duplicate experiments of the foregoing patent made by the present inventors, on the addition of some oxides to the extent within an actually acceptable amount for a battery, the removal of hydrogen fluoride proceeds too slowly to keep pace with the production of hydrogen fluoride. Accordingly, the foregoing proposal cannot effectively inhibit the deterioration of battery due to hydrogen fluoride.

On the other hand, the above cited JP-A-7-122297 exerts a high dehydration effect by an acid anhydride. As a result, however, an acid derived from the acid anhydride is produced. In other words, the foregoing proposal merely contemplates the substitution of other acids for hydrogen halide. Acetic acid or the like is relatively weaker than hydrogen halide but still deteriorates an electrolytic solution and battery can. Accordingly, the foregoing proposal provides no essential solution to the problems of the prior art.

SUMMARY OF THE INVENTION

It is therefore an object of the present invention to provide an effective prevention of hydrogen halide formation in a nonaqueous electrolytic solution for a battery containing a supporting electrolyte which can react with water to produce an acid.

It is another object of the present invention to prevent the occurrence of the foregoing secondary problems of the prior art.

These and other objects of the present invention will become more apparent from the following detailed description and examples.

The inventors paid their attention to the fact that the enclosure of water content, which causes the production of an acid, by a harmless complex-forming reaction which occurs at a high reaction rate gives an effective solution to the foregoing problems.

The objects of the present invention is accomplished with the first aspect of the present invention which concerns a nonaqueous electrolytic solution for a battery, comprising: a supporting electrolyte which can react with water to produce an acid; and a complex-forming compound which forms an inert complex by interacting with water and said supporting electrolyte to prevent acid generation.

The objects of the present invention is also accomplished with the second aspect of the present invention which concerns a nonaqueous electrolytic solution battery, comprising: an active electrode material of lithium or a compound thereof; and a nonaqueous electrolytic solution comprising a supporting electrolyte which can react with water to produce an acid, and a complex-forming compound which forms an inert complex by interacting with water and said supporting electrolyte to prevent acid generation.

In accordance with the first and second aspects of the present invention, any water content, if previously contained in the nonaqueous electrolytic solution or adsorbed by the nonaqueous electrolytic solution from other battery materials, can be enclosed in an inert complex formed by the reaction of a complex-forming compound.

Unlike the equilibrium reaction such as acid formation, a complex-forming reaction normally tends to be irreversible. Therefore, the complex-forming reaction occurs in preference to the foregoing reaction (1), making it possible to provide an effective inhibition of the production of an acid.

A complex-forming reaction is normally characterized by a high reaction rate that eliminates the disadvantages due to the lower rate of reaction as in the invention described in JP-A-4-284372. Further, the present invention is not liable to the disadvantage that other harmful substances are secondarily produced as in the invention described in JP-A-7-122297.

As mentioned above, despite the incorporation of a supporting electrolyte which can react with water to produce an acid, the nonaqueous electrolytic solution for a battery or nonaqueous electrolytic solution battery according to the present invention is not liable to deterioration of the materials constituting the battery or the battery properties even if the nonaqueous electrolytic solution has water incorporated therein.

BRIEF DESCRIPTION OF THE DRAWINGS

By way of example and to make the description more clear, reference is made to the accompanying drawings in which.

DETAILED DESCRIPTION OF THE INVENTION

Figure 1:
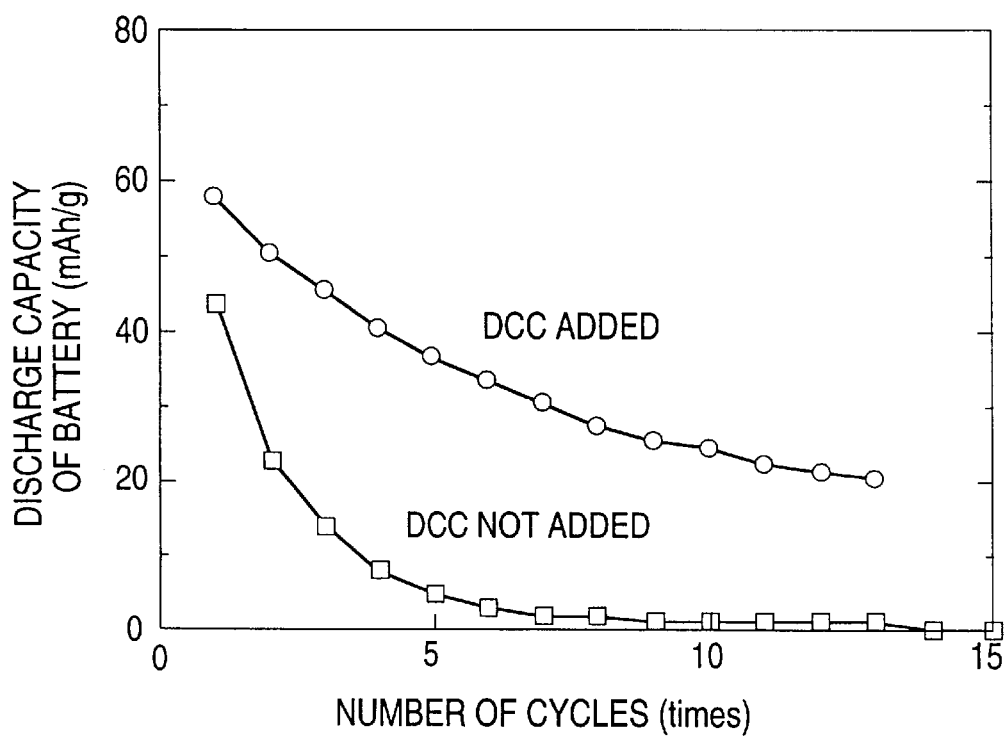
FIG. 1 is a graph illustrating the charge-discharge cycle characteristics of an example of the present invention and a comparative example.

Embodiments of the first and second aspects of the present invention will be described hereinafter.

1. Object of the Present Invention

As a rule, all nonaqueous electrolytic solutions for batteries containing a supporting electrolyte which can react with water to produce a hydrogen halide and nonaqueous batteries comprising such nonaqueous electrolytic solutions can be objects of the present invention. At present, batteries comprising at least lithium or a compound thereof as either an active positive or negative electrode material, i.e., so-called "lithium batteries" predominate in nonaqueous electrolytic solution batteries.

Examples of these lithium batteries as objects of the present invention include lithium battery (primary battery) comprising lithium as a negative electrode and manganese dioxide, zinc fluoride, copper oxide, thionyl chloride or the like as a positive electrode, lithium storage battery (secondary battery) comprising lithium or an alloy thereof incorporated as a negative electrode and activated carbon, titanium disulfide, molybdenum disulfide or the like as a positive electrode, and lithium ion battery comprising a carbon material capable of occluding/releasing lithium ion as a negative electrode and a lithium transition metal compound as a positive electrode.

Any batteries, even if not lithium batteries as mentioned above, can be nonaqueous electrolytic solution batteries to which the present invention can be applied so far as the foregoing problems of the prior art occur.

2. Supporting Electrolyte

A supporting electrolyte is a material to be incorporated in a nonaqueous electrolytic solution for a battery for the purpose of enhancing the electrical conductivity of the electrolytic solution and hence efficiently effecting charge/discharge of the battery. Well known supporting electrolytes are $LiPF_6$, $LiBF_4$ and $LiClO_4$, but the present invention is not limited thereto. Other examples of supporting electrolytes include an ordinary supporting electrolyte, e.g., $LiAsF_6$, which can slightly react with water to produce a hydrogen halide such as hydrogen fluoride.

3. Organic Solvent in Nonaqueous Electrolytic Solution for Battery

The kind of the organic solvent to be used for the nonaqueous electrolytic solution for a battery is not limited unless significantly mismatched with the supporting electrolyte. Examples of the organic solvent employable herein include ethylene carbonate (EC), propylene carbonate (PC), diethyl carbonate (DEC), dimethyl carbonate, dimethoxy ethane, and γ-butyrolactone. Two or more of these organic solvents may be used in admixture.

4. Complex-Forming Compound

The term "complex-forming compound" as used herein is meant to indicate a compound which reacts with water and the foregoing supporting electrolyte to produce an inert complex. A typical example of such a compound is a carbodiimide compound represented by the general formula (2):

$$R_1\text{—}N\text{=}C\text{=}N\text{—}R_2 \qquad (2)$$

wherein $R_1$ and $R_2$ may be the same or different and each represent a hydrogen atom or a hydrocarbon group. The term "hydrocarbon group" as used herein is meant to indicate a saturated or unsaturated chain, branched or cyclic (including aromatic) hydrocarbon group.

If the complex-forming compound of the present invention is a carbodiimide compound represented by the foregoing general formula (2), the complex-forming mechanism is presumed as follows.

If there is no carbodiimide compound, $LiPF_6$ undergoes ionic dissociation to produce $PF_6$ negative ion which then reacts with water to liberate HF as in the foregoing reaction formula (1). On the contrary, if there is a carbodiimide compound, double bond in diimide bond —N=C=N— undergoes weak hydrogen bonding to water molecule, and $PF_6$ negative ion is electrically bonded to the hydrogen bond to produce a complex that prevents the production of HF.

In the foregoing complex-forming mechanism, $R_1$ and $R_2$ don't take direct part in the production of a complex but assure the solubility of the carbodiimide compound in the nonaqueous electrolytic solution to facilitate the production of a complex. For this reason, $R_1$ and $R_2$ each is more preferably a $C_{3-8}$ alkyl or cycloalkyl group. Specific examples of such a $C_{3-8}$ alkyl or cycloalkyl group include straight-chain propyl group, butyl group, pentyl group, hexyl group, heptyl group, octyl group, all structural isomers thereof (e.g., iso-, sec-, tert-), cyclohexyl group, (cyclohexyl)methyl group, methylcyclohexyl group having methyl side chain in arbitrary substitution position, dimethylhexyl group or ((methyl)cyclohexyl)methyl group having methyl side chain in arbitrary substitution position, and ethylcyclohexyl group having ethyl side chain in arbitrary substitution position.

Alternatively, $R_1$ and $R_2$ each may be an unsaturated phenyl, naphthyl or vinyl group or may be an alkyl or cycloalkyl group having less than 3 or more than 8 carbon atoms. Further, at least one of $R_1$ and $R_2$ may be a $C_{3-8}$ alkyl or cycloalkyl group while the other may be an unsaturated phenyl, naphthyl or vinyl group, an alkyl or cycloalkyl group having less than 3 or more than 8 carbon atoms or a hydrogen atom.

These complex-forming compounds may be used singly or in combination.

The carbodiimide compound is preferably incorporated in the nonaqueous electrolytic solution in an amount of not less than 30 ppm based on the weight of the nonaqueous electrolytic solution for the reason that the nonaqueous electrolytic solution normally has a water content of about 30 ppm.

More preferably, the carbodiimide compound should be incorporated in the nonaqueous solution in an amount of from 1,000 to 5,000 ppm based on the weight of the nonaqueous electrolytic solution. On the contrary, the addition of the carbodiimide compound in an amount of more than 10,000 ppm is nonsense or undesirable for the reason that it lowers the electrical conductivity of the electrolytic solution itself.

The process for the addition of the complex-forming compound of the present invention is not limited. For example, the complex-forming compound of the present invention may be added to the nonaqueous electrolytic solution before battery assembly or may be directly put in is the battery vessel before sealing following battery assembly. Further, the dispersion status of the complex-forming compound added to the nonaqueous electrolytic solution is not also limited.

5. Positive Electrode in Nonaqueous Electrolytic Solution Battery

Since the positive electrode is not a main part of the constitution of the present invention, its constitution is not specifically limited so long as it doesn't conflict with the main part of the present invention. Therefore, the positive electrode may take a known or arbitrary constitution.

For example, if the nonaqueous electrolytic solution battery is a lithium ion battery, the positive electrode may be formed by a process which comprises mixing at least one of $LiCoO_2$, $LiNiO_2$ and $LiMn_2O_4$ as an active positive electrode material, an electrically conducting aid and a binder, adding a solvent to the mixture to make a paste-like compound, applying the paste-like compound thus prepared to both sides of an aluminum foil as an electronic collector for a positive electrode, drying the coated material, and then compression-molding the coated material by a roll press.

6. Negative Electrode in Nonaqueous Electrolytic Solution Battery

Since the negative electrode is not a main part of the constitution of the present invention, its constitution is not specifically limited so long as it doesn't conflict with the main part of the present invention. Therefore, the negative electrode may take a known or arbitrary constitution.

For example, if the nonaqueous electrolytic solution battery is a lithium ion battery, any carbon material which can reversibly occlude/release lithium ion, such as graphitizing carbon, non-graphitizing carbon and graphitized material may be used. The negative electrode may be prepared by a process which comprises mixing at least one of these active negative electrode materials and a binder, adding a solvent to the mixture to prepare a paste-like compound, applying the paste-like compound to both sides of a copper foil as an electronic collector for a negative electrode, drying the coated material, and then compression-molding the coated material by a roll press.

In the foregoing nonaqueous electrolytic solution battery which is a lithium ion battery, either the positive electrode or the negative electrode may comprise metallic lithium instead of the foregoing active electrode material.

7. Constitution of Nonaqueous Electrolytic Solution Battery

Since the entire battery is not a main part of the constitution of the present invention, its constitution is not specifically limited so long as it doesn't conflict with the main part of the present invention. Therefore, the entire battery may take a known or arbitrary constitution.

Referring to battery shape, for example, the battery may be cylindrical, rectangular or the like. In order to form a cylindrical battery, an ordinary method may be used which comprises cylindrically winding a positive electrode and a negative electrode with a separator interposed therebetween, putting the coil into a battery can, and then injecting an electrolytic solution into the battery can.

The present invention will be further described in the following examples of the first and second aspects of the present invention.

EXAMPLE 1

To 50 ml of an electrolytic solution (1 mol/l of $LiPF_6$/EC+PC+DEC (3:1:2)) available from Mitsubishi Chemical Corporation were 500 ppm of ion-exchanged water and N,N'-dicyclohexylcarbodiimide (hereinafter referred to as "DCC") in an amount of 1.4 mols per mol of ion-exchanged water (available from Wako Pure Chemical Industries, Ltd.). The mixture was then sealed in a sample bottle. Three such samples were allowed to stand at room temperature for 30 minutes, 1 day and 7 days, respectively. These electrolytic solution samples were each determined for acid content by neutralization titration with a 0.1 mol/l aqueous solution of NaOH (available from Wako Pure Chemical Industries, Ltd.).

Separately, a comparative sample was prepared in the same manner as mentioned above except that DCC was not added. This comparative sample was similarly determined for acid content.

The results are set forth in Table 1. The unit of numerical values set forth in Table 1 is mmol/l. Table 1 shows that the present example, which involves the addition of DCC, can provide inhibition of the production of hydrofluoric acid and shows no increase of the produced amount of hydrofluoric acid with time during which it is allowed to stand.

TABLE 1

| | | Storage time | | |
|---|---|---|---|---|
| Example No. | Additive | 30 min. | 1 day | 7 days |
| Example 1 | DCC | 0.5 | 0.4 | 0.7 |
| | None | 5.8 | 61.3 | 86.3 |
| Example 2 | DCC | 1.9 | 1.1 | 1.6 |
| Example 3 | DIC | 0.4 | 0.9 | 0.5 |
| Comparative Example 1 | BaO | 7.6 | 55.3 | 73.2 |
| Comparative Example 2 | Acetic anhydride | 107.7 | 107.4 | 106.7 |

EXAMPLE 2

The procedure of Example 1 was followed except that the added amount of DCC was changed to 0.3 mols per mol of 500 ppm of ion-exchanged water. The results set forth in Table 1 show that the present example, which involves the addition of DCC, can provide inhibition of the production of hydrofluoric acid and shows no increase of the produced amount of hydrofluoric acid with time during which it is allowed to stand.

EXAMPLE 3

The procedure of Example 1 was followed except that N,N'-diisopropylcarbodiimide (hereinafter referred to as "DIC"; available from Wako Pure Chemical Industries, Ltd.) was added instead of DCC in an amount equimolecular with DCC. The results set forth in Table 1 show that the present example, which involves the addition of DIC, can provide inhibition of the production of hydrofluoric acid and shows no increase of the produced amount of hydrofluoric acid with time during which it is allowed to stand.

COMPARATIVE EXAMPLE 1

A duplicate experiment was carried out to reconfirm the effect of a metal oxide for inhibiting the production of hydrofluoric acid in the invention described in JP-A-4-284372. In some detail, the procedure of Example 1 was followed except that BaO (available from Wako Pure Chemical Industries, Ltd.) was suspended in the electrolytic solution in an amount 0.5% by weight based on the electrolytic solution. The results set forth in Table 1 show that the present comparative example, which involves the addition of BaO, cannot provide inhibition of the production of hydrofluoric acid. Thus, the addition of BaO exerts no effects.

COMPARATIVE EXAMPLE 2

A duplicate experiment was carried out to reconfirm the effect of an acid anhydride for inhibiting the production of acid in the invention described in JP-A-7-122297. In some detail, the procedure of Example 1 was followed except that acetic anhydride (available from Wako Pure Chemical Industries, Ltd.) was added instead of DCC in an amount equimolecular with DCC. The results set forth in Table 1 show that the present comparative example, which involves the addition of acetic anhydride, cannot provide inhibition of the production of acid. Thus, the addition of acetic anhydride exerts no effects. This is possibly because although the production of hydrofluoric acid may be inhibited, acetic acid is produced instead.

EXAMPLE 4

18.5 parts by weight of $LiMn_2O_4$ (available from Mitsui Mining & Smelting Co., Ltd.), 1.5 parts by weight of acetylene black (available from Tokai Carbon Co., Ltd.), 8 parts by weight of a polyvinylidene fluoride powder (available from Kureha Chemical Industry Co., Ltd.) and 72 parts by weight of N-methylpyrrolidone (available from Wako Pure Chemical Industries, Ltd.) were thoroughly mixed to obtain a slurry.

The slurry thus obtained was applied to a 20 μm thick aluminum foil (positive electrode collector) by means of an applicator, and then dry-pressed to obtain a positive electrode material having a thickness of 160 μm having $LiMn_2O_4$ coated on both sides thereof.

Separately, 100 parts by weight of graphite (MCMB, available from OSAKA GAS CO., LTD.) were thoroughly mixed with 100 parts by weight of a solution of 10 parts by weight of a polyvinylidene fluoride powder in 100 parts by weight of N-methylpyrrolidone to obtain a slurry. The slurry thus obtained was applied to a 10 μm thick copper foil (negative electrode collector), and then dry-pressed to obtain a negative electrode material having a thickness of 100 μm having a carbon material coated on both sides thereof.

A disc having a diameter of 15 mm stamped out from the foregoing positive material was used as a positive electrode. A disc having a diameter of 17 mm stamped out from the foregoing negative material was used as a negative electrode. A disc having a diameter of 19.5 mm stamped out from a polyethylene separator (available from Tonen Corporation) was used as a separator. The positive electrode and the negative electrode were arranged opposed to each other with the separator interposed therebetween to prepare a coin-shaped battery.

Into the foregoing battery was injected an electrolytic solution prepared by adding to 1 mol/l of $LiPF_6$/EC+DEC (1:1) available from Mitsubishi Chemical Corporation, 500 ppm of ion-exchanged water and DCC in an amount of 1.4 mols per mol of ion-exchanged water, and then heating the mixture at a temperature of 60° C. for 96 hours. The battery can was then sealed to prepare a battery sample of the present example.

The foregoing battery sample of the present example and a comparative sample were then subjected to cycle deterioration test. In some detail, the battery samples were each charged at a constant current of 1 $mA/cm^2$ and a constant voltage until the battery voltage reached 4.2 V (for 6 hours). Subsequently, the battery was discharged at a constant current of 0.5 $mA/cm^2$ until the battery voltage reached 3.0 V. This charge-discharge cycle was repeated.

The results are set forth in FIG. 1. The results show that the addition of DCC provides remarkable improvement in the cycle characteristics of the battery.

EXAMPLE 5

Batteries were prepared in the same manner as in Example 4 except that the amount of ion-exchanged water to be added to the electrolytic solution containing DCC and the electrolytic solution free of DCC was increased to 1,500 ppm. These batteries were then subjected to cycle deterioration test in the same manner as in Example 4.

Figure 2:
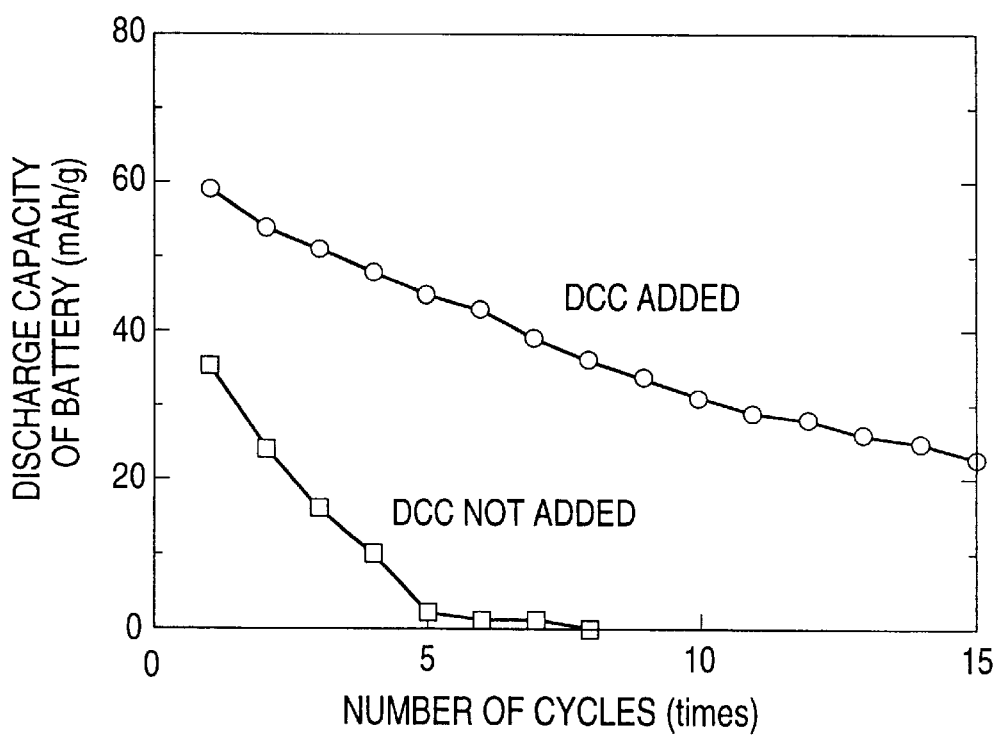
FIG. 2 is a graph illustrating the charge-discharge cycle characteristics of an example of the present invention and a comparative example.

The results are set forth in FIG. 2. The results, too, show that the addition of DCC provides remarkable improvement in the cycle characteristics of the battery. The results also show that the sample of the present example containing DCC stands comparison with that of Example 4, which contains less water content than the present example.

EXAMPLE 6

A battery was prepared in the same manner as in Example 4 except that a carbon material positive electrode in the form of a disc having a diameter of 15 mm (having the same structure as the negative electrode of Example 4) was used as a positive electrode, metallic lithium (available from Hayashi Kasei Co., Ltd.) in the form of a disc having a diameter of 17 mm was used as a negative electrode and the added amount of DCC was 3.6 mmol/l. Separately, a comparative battery sample was prepared in the same manner as above except that DCC was not added.

Figure 3:
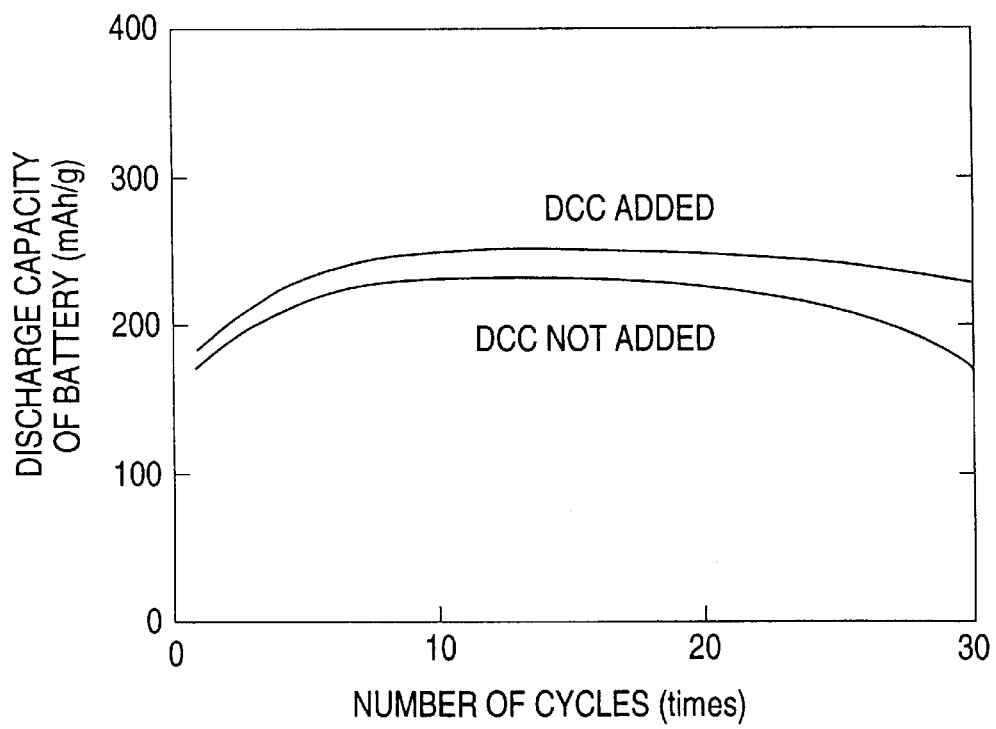
FIG. 3 is a graph illustrating the battery capacity of an example of the present invention and a comparative example.

The battery sample of the present example and the comparative sample were then subjected to charge-discharge test. In some detail, the battery was charged at a constant current of 0.5 $mA/cm^2$ until the battery voltage reached 1.5 V. The battery was then discharged at a constant current of 0.5 $mA/cm^2$ until the battery voltage reached 0 V. The results are set forth in FIG. 3. The results show that the addition of DCC provides remarkable improvement in the battery capacity.

EXAMPLE 7

A battery was prepared in the same manner as in Example 4 except that the electrolytic solution was replaced by 1 mol/l of $LiBF_4$/EC+DEC (1:1) available from Toyama Yakuhin Kogyo K.K. to which DCC was then added or not added. The battery thus prepared was then subjected to cycle deterioration test.

Figure 4:
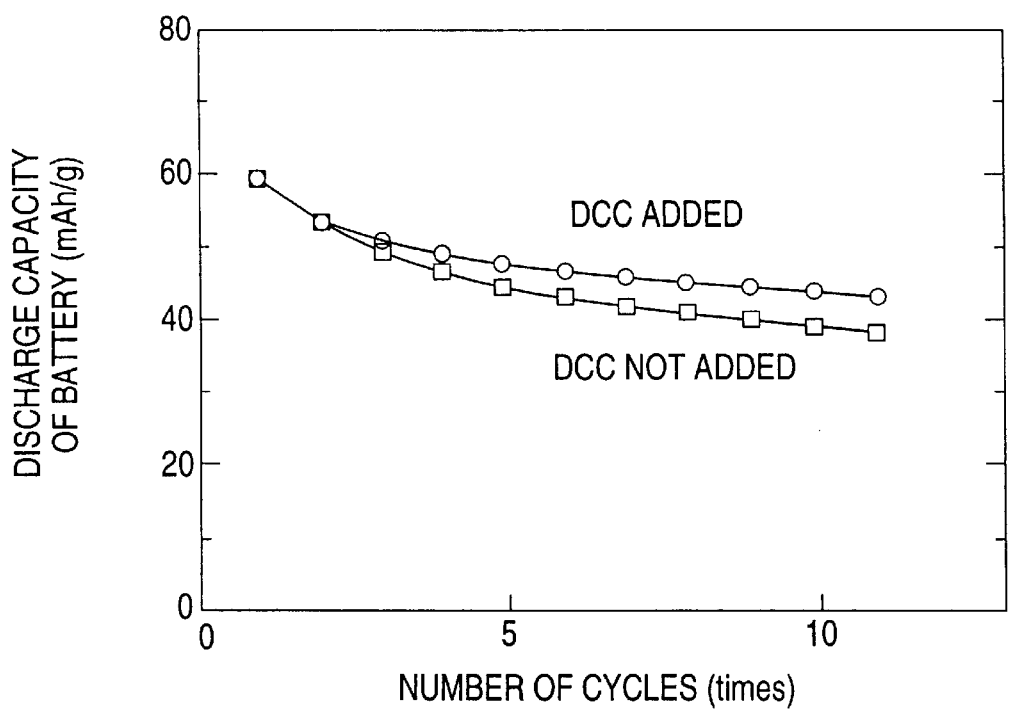
FIG. 4 is a graph illustrating the charge-discharge cycle characteristics of an example of the present invention and a comparative example.

The results are set forth in FIG. 4. The results show that the addition of DCC provides effective improvement in the cycle characteristics of the battery. This demonstrates that the addition of DCC can exert a good effect also on an electrolytic solution comprising $LiBF_4$ as a supporting electrolyte.

While the invention has been described in detail and with reference to specific embodiments thereof, it will be apparent to one skilled in the art that various changes and modifications can be made therein without departing from the spirit and scope thereof.

What is claimed is:

1. A nonaqueous electrolytic solution for a battery, comprising:
   a) a supporting electrolyte which reacts with water to produce an acid; and
   b) a complex-forming compound which forms an inert complex by interacting with water and said supporting electrolyte to prevent acid generation;
   wherein said complex-forming compound is a carbodiimide compound having the formula:

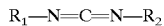

wherein $R_1$ and $R_2$ are selected from the group consisting of a hydrogen atom and hydrocarbon substituents.

2. The nonaqueous electrolytic solution for a battery of claim 1, wherein said supporting electrolyte is at least one selected from the group consisting of $LiPF_6$, $LiBF_4$ and $LiClO_4$.

3. The nonaqueous electrolytic solution for a battery of claim 1, wherein said carbodiimide compound is incorporated in the nonaqueous electrolytic solution in an amount of not less than 30 ppm based on the weight of the nonaqueous electrolytic solution.

4. The nonaqueous electrolytic solution for a battery of claim 3, wherein said carbodiimide compound is incorporated in the nonaqueous electrolytic solution in an amount of from 1,000 ppm to 5,000 ppm based on the weight of the nonaqueous electrolytic solution.

5. The nonaqueous electrolytic solution for a battery of claim 1, which is based on an organic solvent selected from the group consisting of ethylene carbonate, propylene carbonate, diethyl carbonate, dimethyl carbonate, dimethoxy ethane, and γ-butyrolactane.

6. A nonaqueous electrolytic solution battery, comprising:
   a) an active electrode material of lithium or a compound thereof; and
   b) the nonaqueous electrolytic solution of claim 1.

* * * * *